(12) United States Patent
Zorine (10) Patent No.: US 8,678,496 B2
(45) Date of Patent: Mar. 25, 2014

(54) PIVOT PIN RETAINER MECHANISM

(75) Inventor: Maxim Vladimirovich Zorine, Ann Arbor, MI (US)

(73) Assignee: Johnson Controls Technology Company, Holland, MI (US)

( * ) Notice: Subject to any disclaimer, the term of this patent is extended or adjusted under 35 U.S.C. 154(b) by 271 days.

(21) Appl. No.: 13/002,833

(22) PCT Filed: Jul. 16, 2009

(86) PCT No.: PCT/US2009/050857
§ 371 (c)(1),
(2), (4) Date: Mar. 9, 2011

(87) PCT Pub. No.: WO2010/009321
PCT Pub. Date: Jan. 21, 2010

(65) Prior Publication Data
US 2011/0187168 A1 Aug. 4, 2011

Related U.S. Application Data

(60) Provisional application No. 61/081,215, filed on Jul. 16, 2008.

(51) Int. Cl.
*A47C 15/00* (2006.01)
(52) U.S. Cl.
USPC .............................. 297/248; 297/463.1
(58) Field of Classification Search
USPC .................... 297/248, 354.1, 463.1
See application file for complete search history.

(56) References Cited

U.S. PATENT DOCUMENTS

| 4,883,319 | A | * | 11/1989 | Scott | 297/354.1 |
|---|---|---|---|---|---|
| 4,958,877 | A | * | 9/1990 | Lezotte et al. | 296/65.17 |
| 4,971,379 | A | | 11/1990 | Rumpel et al. | |
| 5,577,295 | A | * | 11/1996 | Papke et al. | 16/254 |
| 5,700,058 | A | * | 12/1997 | Balagurumurthy et al. | 297/440.15 |
| 7,073,861 | B2 | * | 7/2006 | Ichikawa et al. | 297/378.1 |
| 7,083,215 | B2 | * | 8/2006 | Rhee et al. | 296/65.16 |

OTHER PUBLICATIONS

International Search Report, Form PCT/ISA/210, International application No. PCT/US 09/50857, dated Sep. 3, 2009.

* cited by examiner

*Primary Examiner* — Philip Gabler
(74) *Attorney, Agent, or Firm* — Butzel Long (57) ABSTRACT

A vehicle seat assembly 12 having a bracket assembly, the vehicle seat assembly 12 having a first seat back 22 having a seat frame member, and a second seat back 24 having a seat frame member, the bracket assembly having a first bracket 44 coupled to the first seat back 22, preferably the seat frame member, the first bracket 44 having an aperture 42, a second bracket 28 coupled to the second seat back 24, preferably the seat frame member, the second bracket 24 having a pivot pin 32 for insertion into the aperture 42 of the first bracket 22. The vehicle seat assembly 12 also including a retainer mechanism 34 for retaining the pivot pin 32 within the aperture 42 of the first bracket 22, the retainer mechanism 34 having a first bushing 40, a second bushing 36 and a retainer member 38.

11 Claims, 10 Drawing Sheets

FIG. 5B
Section A-A

FIG. 5C
Section B-B

STEP 4. LH Seat Back Attachment to the vehicle (shown from the rear)

FIG. 6D

STEP 3. LH Seat Back Frame and Floor Bracket Assembly Installation

PIVOT PIN RETAINER MECHANISM

CROSS REFERENCE TO RELATED APPLICATIONS

This application claims the benefit of and priority to U.S. Provisional Patent Application No. 61/081,215, filed Jul. 16, 2008, titled: PIVOT PIN RETAINER MECHANISM, in the name of Zorine which is incorporated by reference herein.

BACKGROUND

The present disclosure relates generally to the field of vehicle seating. More specifically, this disclosure relates to a pivot pin coupling for vehicle seat assemblies.

Conventional pivot pin couplings require significant amount of space to be installed and are typically difficult to manually install because of their complexity. Moreover, conventional pivot pin couplings require a customer to use a number of fasteners to assemble the vehicle seat which further adds to their complexity and cost.

There remains a significant need to provide a pivot pin coupling that occupies less space, can be more easily installed, and allows the seat row to be assembled without the use of fasteners.

SUMMARY

In one exemplary embodiment, there is disclosed a vehicle seat having a first seat back having a seat frame member, a second seat back having a seat frame member and a bracket assembly adapted for connecting the first and second seat backs to the vehicle and for supporting the vehicle seat backs to pivot with respect to the vehicle. The bracket assembly of the disclosed exemplary embodiment preferably includes a first bracket having at least one aperture, the first bracket being adapted to be coupled to the seat frame member of the first seat back, and a second bracket adapted for being coupled to the seat frame member of the second seat back, the second bracket having a pivot pin for insertion into the at least one aperture of the first bracket. The bracket assembly, and a vehicle seat including the bracket assembly of the disclosed embodiments, further preferably include a retainer mechanism for retaining the pivot pin within the aperture of the first bracket, the retainer mechanism having a first bushing, a second bushing and a retainer member.

In another exemplary embodiment, a bracket assembly for supporting a pair of vehicle seat back frames is disclosed, the pivot bracket assembly including a bracket portion for connection to the vehicle, the bracket portion having a first pivot pin portion for connection with one seat back frame and a second pivot pin portion for connection with the other seat back frame; and wherein the first pivot pin portion is adapted to be coupled to the one seat back frame by a first bushing coupled with the first pivot pin and between a first side portion of the bracket and a first side portion of the one seat back frame and the second pivot pin portion is adapted to be coupled to the other seat back frame by a fastener.

DETAILED DESCRIPTION

Figure 1:
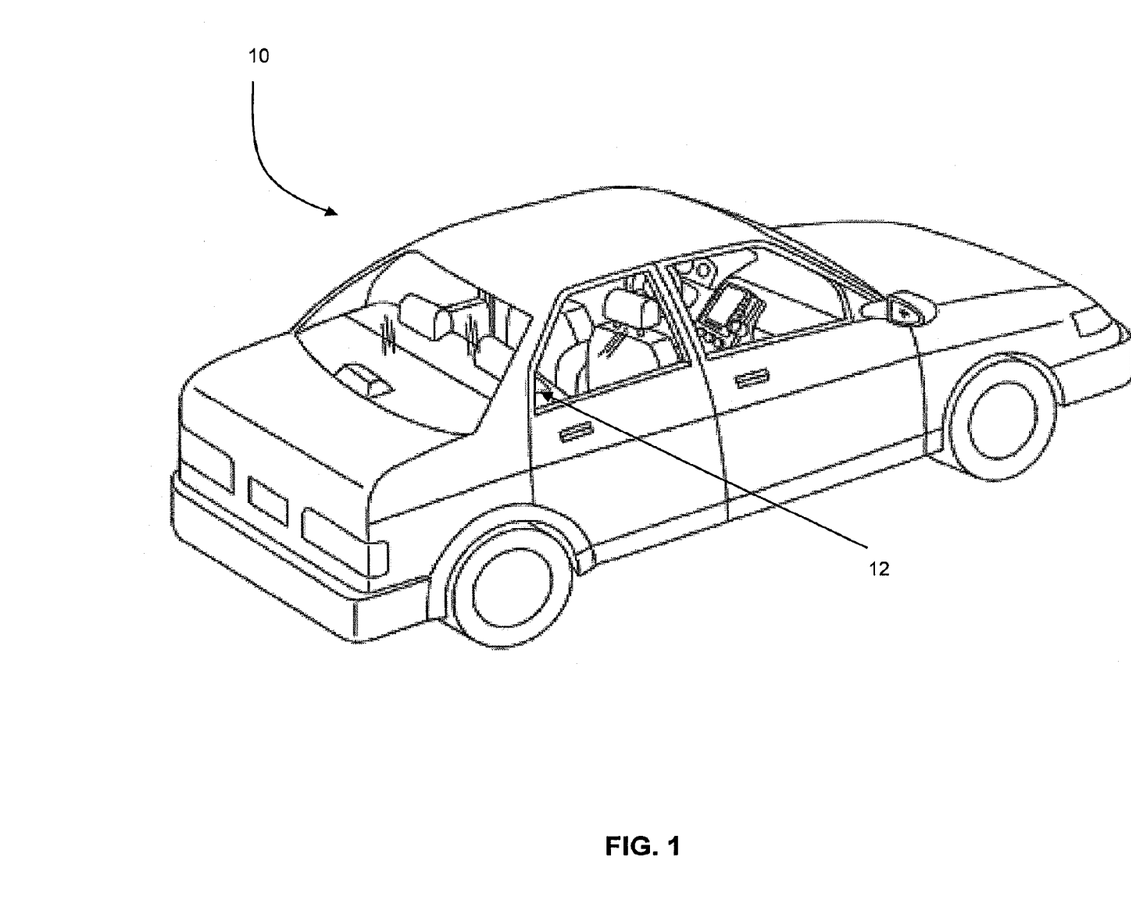
FIG. 1 is a perspective view of a vehicle having a seat assembly according to an exemplary embodiment.
Figure 2:
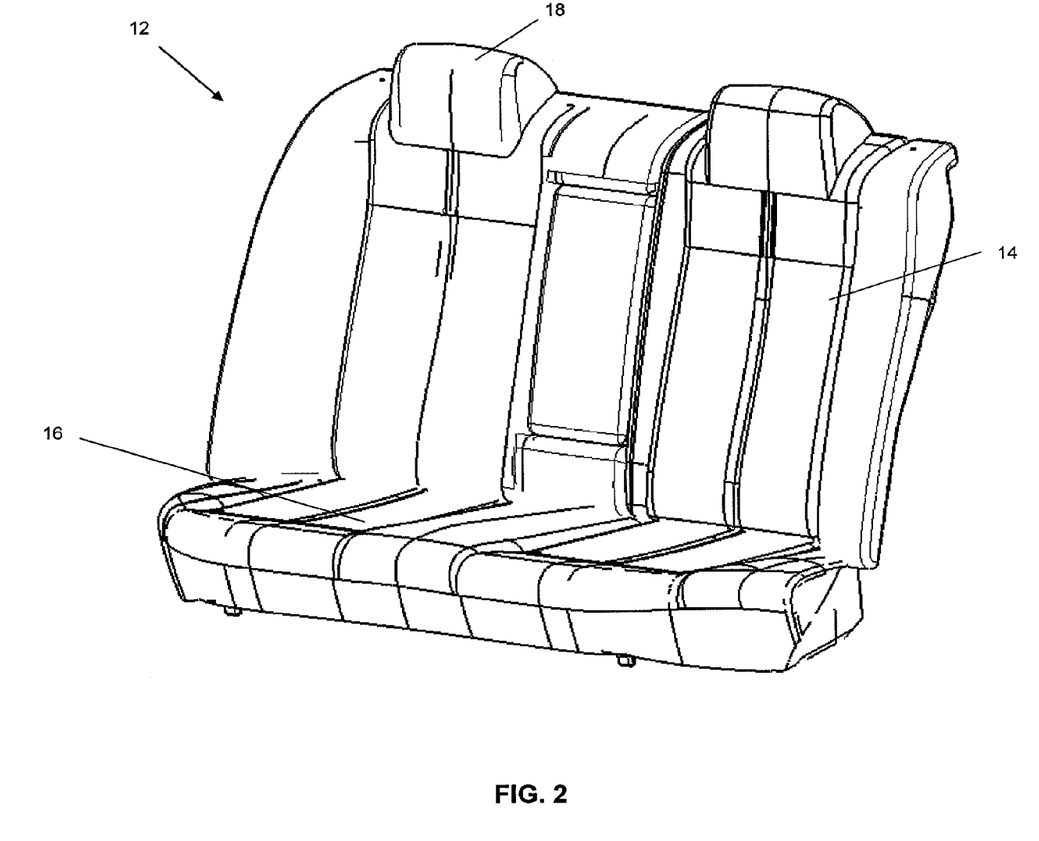
FIG. 2 is a perspective view of a seat assembly according to an exemplary embodiment.

Referring generally to the figures and in particular to FIG. 1, a vehicle 10 is shown according an exemplary embodiment. The vehicle 10 includes one or more vehicle seats 12 provided for an occupant of the vehicle 10. While the vehicle 10 shown is a 4-door sedan, it should be understood that the seat 12 may be used in a mini-van, sport utility vehicle or any other means in or by which someone travels or something is carried or conveyed for any market or application including everything from office seating and transportation to planes and space travel and everything in between. The vehicle seat 12 shown includes a seat back 14 and a seat base 16. One exemplary embodiment of a seat structure 12 is shown in FIG. 2. The seat 12 may include a head restraint 18 and a seat base portion 16. The head restraint 18 extends upward from the seat back 14 and is configured to restrain the head of an occupant during an impact. The seat base portion 16 may be configured to allow the seat 12 to be selectively positioned (manually or motor driven) relative to the vehicle interior.

Figure 3A:
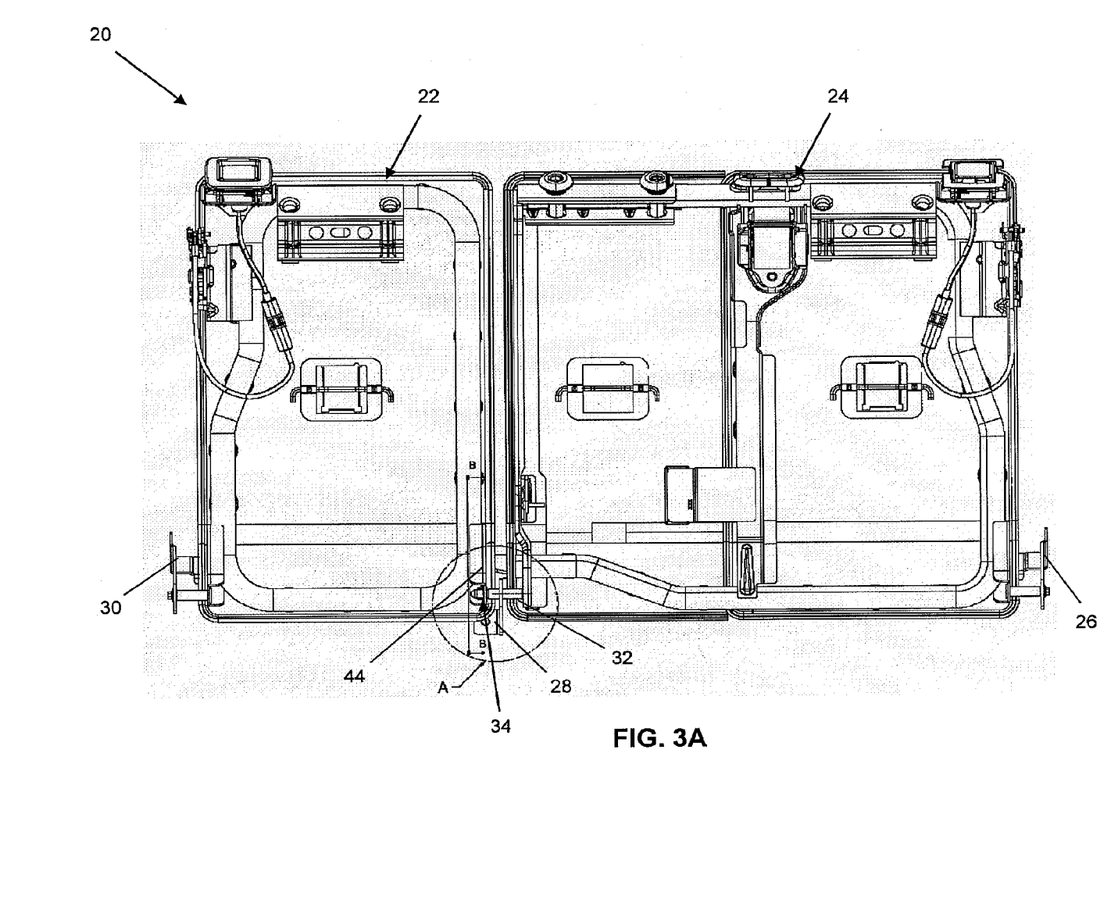
FIG. 3A is a plan view of a seat assembly having a pivot pin coupling according to an exemplary embodiment.
Figure 3B:
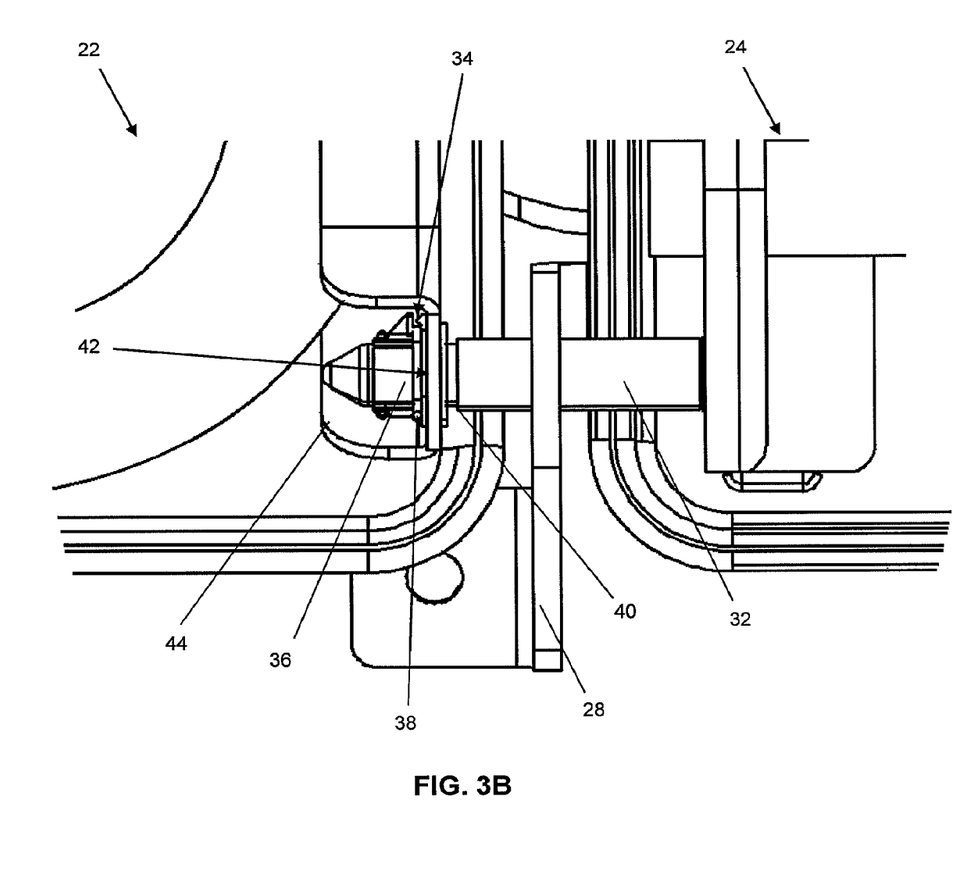
FIG. 3B is an enlarged side view of the pivot pin coupling shown in FIG. 3 according to an exemplary embodiment.
Figure 4:
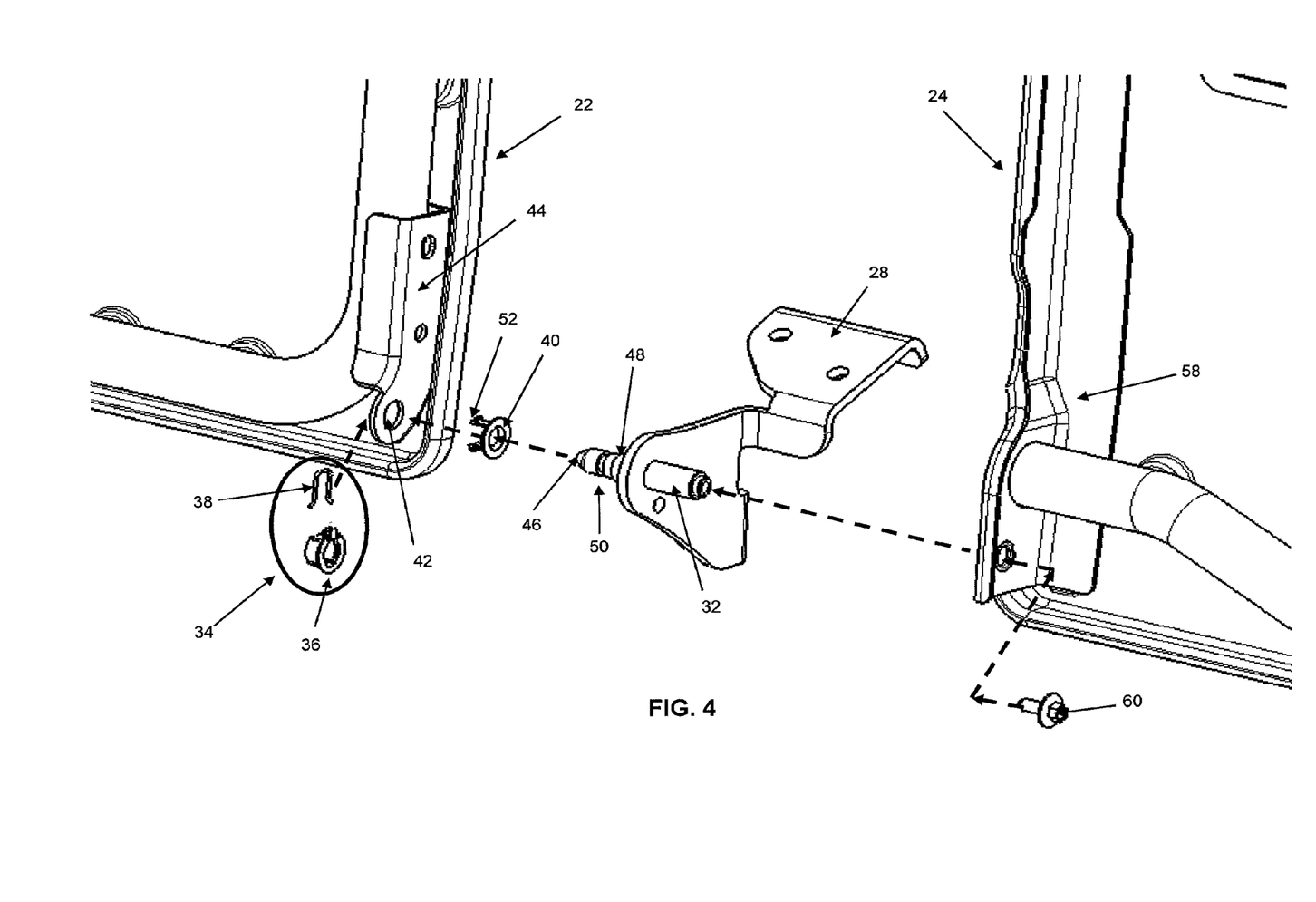
FIG. 4 is an exploded view of a pivot pin retainer shown in FIG. 3 according to an exemplary embodiment.
Figure 5A:
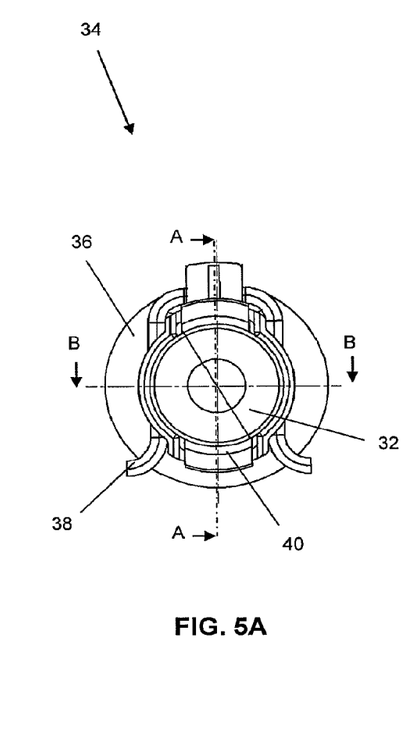
FIG. 5A is a front view of a pivot pin retainer according to an exemplary embodiment.
Figure 5B:
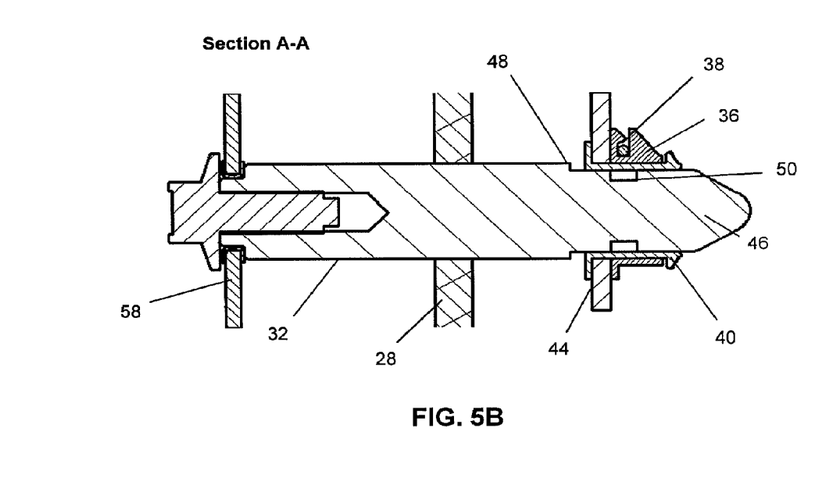
FIG. 5B is a cross sectional view of the pivot pin retainer shown in FIG. 6A along the A-A line according to an exemplary embodiment.
Figure 5C:
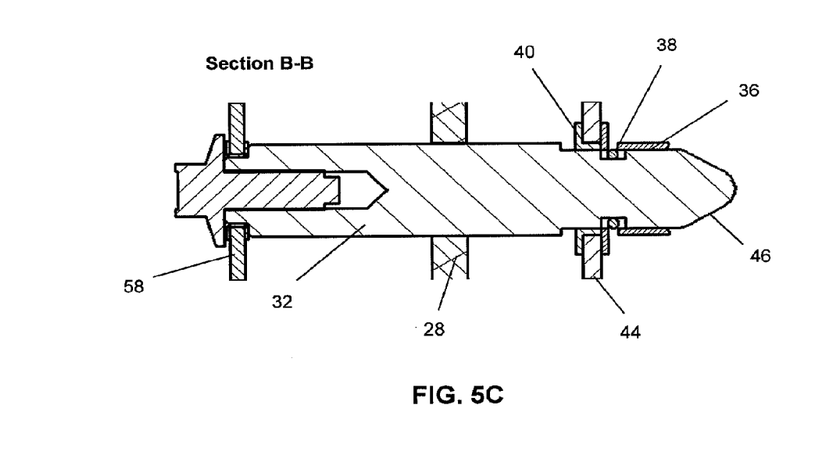
FIG. 5C is a cross sectional view of the pivot pin retainer shown in FIG. 6A along the B-B line according to an exemplary embodiment.

FIG. 3A and 3B shows a vehicle seat back assembly and more particularly, a 60-40 split seat back assembly 20, according to an exemplary embodiment. The split seat back assembly 20 includes a first or right hand (RH) seat back structure 22 and a second or left hand (LH) seat back structure 24. The LH seat back structure 24 makes up approximately sixty percent of the seat row assembly 20 and includes outboard and inboard floor attachment brackets 26, 28 for attaching the LH seat back structure 24 to a vehicle 10. The RH seat back structure 22 makes up approximately forty percent of the seat row assembly 20 and includes a RH outboard attachment bracket 30 for attachment to a vehicle 10. The LH seat inboard floor attachment bracket 28 includes a free pivot pin 32 which allows both the RH an LH seat back 22, 24 to rotate along its axis to a stowed position (alternatively, the free pivot pin 32 may be part of the RH or LH assembly 22, 24). The RH seat 22 includes a pivot pin retaining mechanism 34. The pivot pin retainer mechanism 34 includes a bushing/retainer 36, a retainer (e.g., spring, clip, etc.) 38, and an inner bushing 40 mounted into an aperture 42 of a free pivot bracket 44 which is a part of the RH back structure 22, as best shown assembled in FIG. 3B. The LH seat back structure 24 and the RH seat back structure 22 are aligned side by side laterally along their lengths and are coupled together via the pivot pin retainer mechanism 34 and supported by an inboard bracket 28 incorporating the pivot pin 32 and supported by the vehicle 10.

Referring now to FIG. 4 and FIG. 5A-5C, the pivot pin retainer mechanism 34 is shown in greater detail. According to an exemplary embodiment, the free pivot pin 32 has a generally cylindrical shape having a conical head portion 46 (other suitable shapes may be used) that facilitates insertion into the inner bushing 40, the free pivot pin bracket aperture 42, and the bushing/retainer 36. The free pivot pin 32 also includes a circumferential collar 48 and circumferential groove 50 (e.g., indentation, notch or recess, etc.) both located distally from the head portion 46. Whereas the inner bushing 40 is positioned onto the collar' 48 of the free pivot pin 32, the retainer 38 (e.g., spring, clip, etc.) fits snugly into the groove 50. The inner bushing 40 includes a pair of attachment tabs or barbs 52 (e.g., appendages, extensions, etc.) that flex/move into the bushing/retainer 36 and thereby, along with the retainer spring 38, retain the free pivot pin 32 within the free pivot pin bracket 44.

Figure 6A:
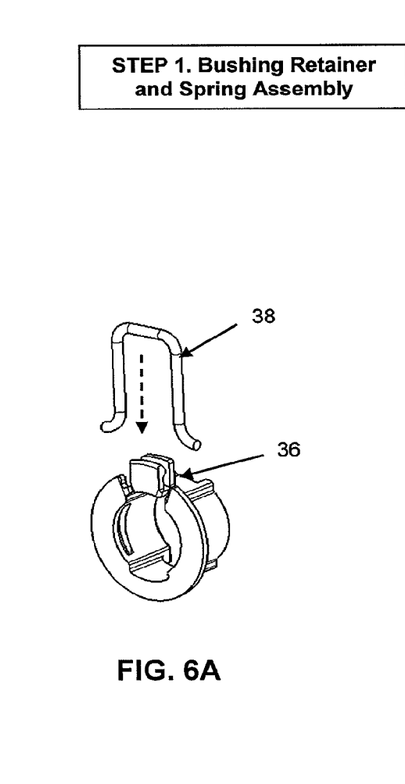
FIGS. 6A-6F is a progression of views of the installation of the LH and RH seat back structures into a vehicle according to an exemplary embodiment.
Figure 6B:
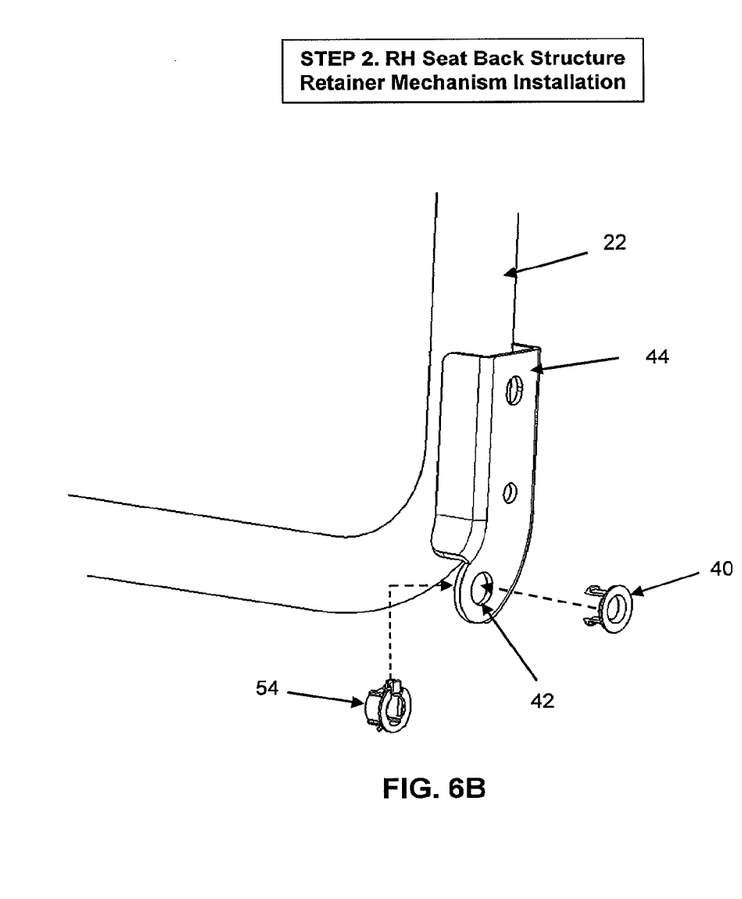
Figure 6C:
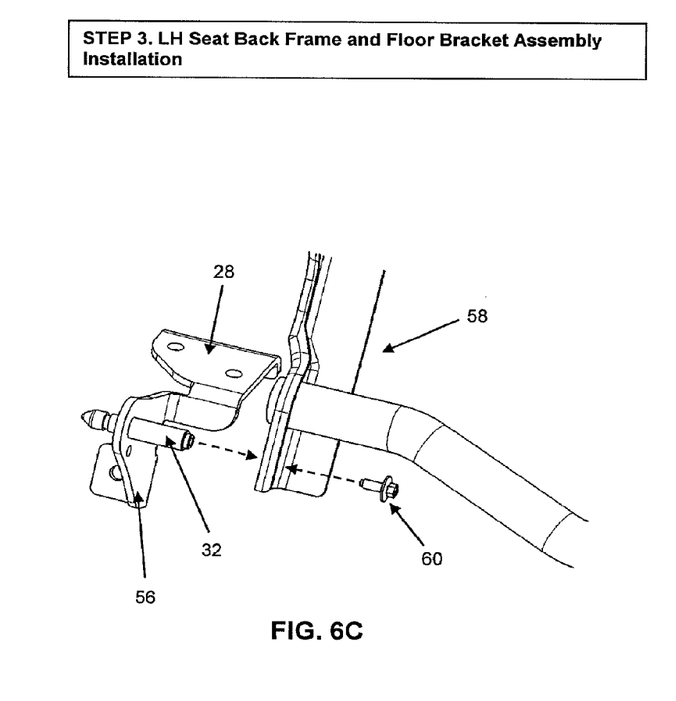
Figure 6D:
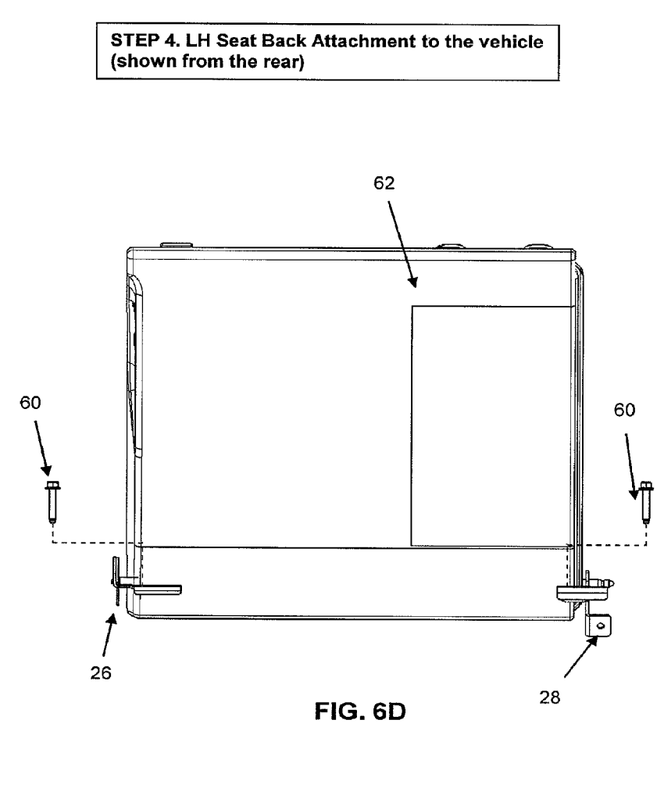
Figure 6E:
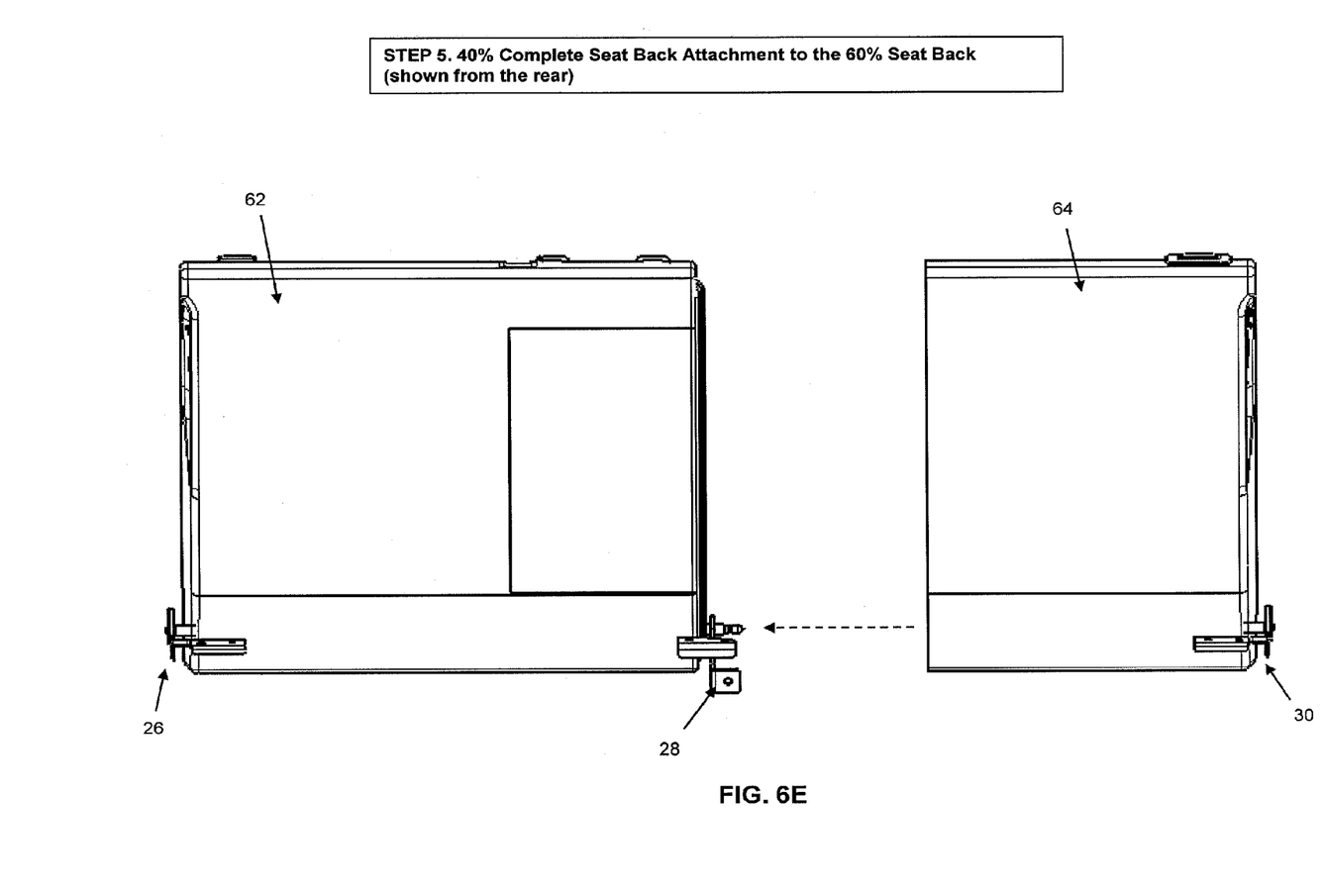
Figure 6F:
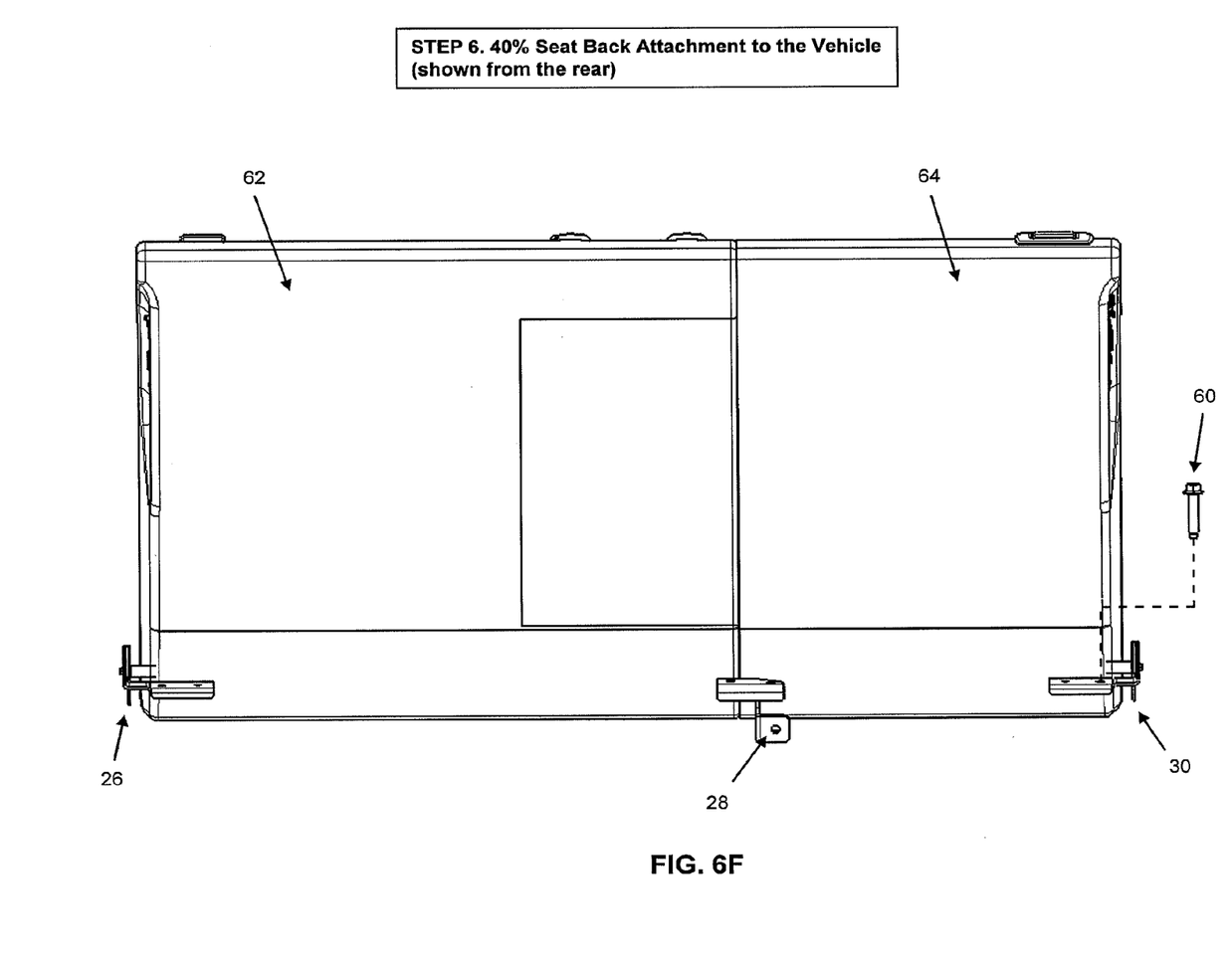

Referring now to FIGS. 6A-6F, the installation of the RH and LH seat back structures 22, 24 into a vehicle according to an exemplary embodiment is shown. At step 1, the retainer spring 38 is coupled onto the bushing retainer 36 to form the bushing retainer spring assembly 54, as shown in FIG. 6A. At step 2, the RH seat back structure retainer mechanism 34 is installed, as shown in FIG. 6B. The inner bushing 40 is then inserted into the aperture 42 of the RH free pivot bracket 44 to snap into the bushing retainer and spring assembly 54 on the other side of the aperture 42. Next, at step 3, the inboard attachment bracket and pin assembly 56 is coupled to the LH back frame 58 via fastening means 60 (e.g., screws, bolts, etc.). The RH and LH seat back assemblies 22, 24 are then completed with installation of foam, trim, and head restraint 18, etc. At step 4, the LH trimmed seat back 62 is inserted into a vehicle 10 and coupled (e.g., bolted, welded, etc.) to the vehicle 10 via the LH outboard attachment bracket 26 and the inboard bracket 28. Next, at step 5, the RH trimmed seat back 64 is inserted into the vehicle 10 and laterally aligned with the LH seat back structure 62 such that the free pivot pin 32 located on the inboard attachment bracket 28 slides into the inner bushing 40 and into the aperture 42 of the free pivot pin bracket 44 located on the RH seat back structure 64. The free pivot pin 32 is then slid into the bushing/retainer 36 and locked into place via the retainer spring 38. At step 6, the RH seat back structure 64 is then coupled (e.g., bolted, welded, etc) to the vehicle 10 via the RH outboard attachment bracket 30 and thereby completing vehicle seat back installation.

According to an exemplary embodiment, the retainer 34 is pre-assembled with the bushing(s) 36, 40 and then installed into the bracket 44 at a JIT assembly plant. By pushing the free pivot pin 32 having the groove 50 thereon through the bushings 36, 40 until the retainer spring 38 latches and secures the free pivot pin 32 into position, a customer is able to assemble the seat row without the use of fasteners (e.g., screws, bolts, insertion fasteners, etc.). More particularly, the seat row 12 can be pre-installed and retained in position and function to couple seat backs 14 without using a screw/bolt-type fastener. The bushing(s) 36, 40 provide for a smooth and reduced rattle and squeak rotation of the free pivot pin 32 relative to the bracket 44. Moreover, the pivot pin retainer mechanism 34 can be installed in very limited space.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

It is also important to note that the construction and arrangement of the elements of the vehicle seat as shown in the preferred and other exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures and combinations. Accordingly, all such modifications are intended to be included within the scope of the present innovations. Other substitutions, modifications, changes and omissions may be made in the design, operating conditions and arrangement of the preferred and other exemplary embodiments without departing from the spirit of the present innovations.

What is claimed is:

1. A vehicle seat assembly comprising:
   a first pivotable seat back having a seat frame member;
   a second pivotable seat back having a seat frame member;
   a first bracket coupled to the seat frame member of the first seat back, the first bracket having an aperture;
   a second bracket coupled to the seat frame member of the second seat back, the second bracket having an aperture and the first seat back is pivotally connected to the second seat back via a pivot pin having a first end inserted into the aperture of the first bracket and a second end inserted into the aperture in the second bracket, the pivot pin including a circumferential groove; and
   a retainer mechanism for retaining the pivot pin within the aperture of the second bracket, the retainer mechanism having a first outer bushing disposed over the second end of the pivot pin, a second inner bushing positioned within the aperture in the second bracket and a retainer spring fitted into the circumferential groove of the pivot pin and coupled onto the first outer bushing to form a bushing retainer spring assembly that retains the pivot pin within the second bracket.

2. The vehicle seat assembly of claim 1, wherein the pivot pin includes a collar for positioning the first outer bushing thereon.

3. The vehicle seat assembly of claim 1, wherein the second inner bushing includes at least one flexible tab member for interlocking the first outer bushing to the second inner bushing.

4. The vehicle seat assembly of claim 1, wherein the retainer spring is a clip.

5. The vehicle seat assembly of claim 1, wherein the pivot pin is substantially cylindrical in shape having a conical head portion for facilitating insertion into the aperture of the second bracket.

6. The vehicle seat assembly of claim 1, wherein the first seat back seat frame member includes a first side member and a second side member; and wherein the first bracket is coupled to the first side member of the first seat back seat frame member.

7. The vehicle seat assembly of claim 1, wherein the second seat back seat frame member includes a first side member and a second side member, and wherein the second bracket is coupled to the first side member of the second seat back seat frame member.

8. A method of installing a vehicle seat assembly using a pivot bracket assembly, the method of installing comprising steps of:

providing a first and a second seat back;

providing a pivot bracket assembly, wherein the pivot bracket assembly includes a first portion for connection to the vehicle, and a pivot pin receiving portion disposed between the first seat back and second seat back, wherein the pivot pin receiving portion supports a pivot pin, and wherein the pivot pin includes a circumferential groove;

inserting an inner bushing into an aperture in the second seat back;

placing an outer bushing over a free end of the inner bushing;

inserting a first end of the pivot pin into an aperture in the first seat back to pivotally connect the first seat back to the pivot bracket assembly;

installing the pivot bracket assembly to the vehicle;

inserting a second end of the pivot pin into an aperture in the second seat back; and locking the outer bushing to the inner bushing using a retainer spring fitted into the circumferential groove of the pivot pin and coupled onto the inner bushing to form a bushing retainer spring assembly that retains the pivot pin within the pivot bracket.

9. The method of claim 8 further including the step of coupling the retainer spring onto the outer bushing.

10. A vehicle seat assembly comprising:

a first pivotable seat back having a seat frame member;

a second pivotable seat back having a seat frame member;

a pivot pin for pivotally coupling the first seat back to the second seat back, wherein the pivot pin includes a circumferential groove, a first end inserted through an aperture in a first bracket coupled to the first seat back and a second end inserted through an aperture in a second bracket coupled to the second seat back; and a retainer mechanism for retaining the pivot pin having a first outer bushing disposed over the second end of the pivot pin, a second inner bushing positioned within the aperture in the second seat back and a retainer spring fitted into the circumferential groove of the pivot pin and coupled onto the first outer bushing to form a bushing retainer spring assembly that locks the pivot pin to the second seat back, wherein the pivot pin includes a collar portion for receiving the first outer bushing thereon and a groove for receiving the retainer member.

11. The vehicle seat assembly of claim 10 further comprising a pivot bracket assembly having a first portion for connection to the vehicle, and a pivot pin receiving portion that supports the pivot pin and is disposed between the first seat back and second seat back.

* * * * *